July 14, 1970  EIICHI URATANI  3,520,149
APPARATUS FOR SEPARATING AND REMOVING OIL CONTAINED
IN CIRCULATING REFRIGERANT
Filed Oct. 29, 1968  2 Sheets-Sheet 1

INVENTOR.
Eiichi Uratani
BY: Kilman and Berman
AGENTS

INVENTOR.
Eiichi Uratani
BY: Kelman and Berman
AGENTS

United States Patent Office
3,520,149
Patented July 14, 1970

3,520,149
APPARATUS FOR SEPARATING AND REMOV-
ING OIL CONTAINED IN CIRCULATING
REFRIGERANT
Eiichi Uratani, 3–1–9 Mukojima, Sumida-ku,
Tokyo, Japan
Filed Oct. 29, 1968, Ser. No. 771,401
Claims priority, application Japan, May 9, 1968,
43/37,287
Int. Cl. F25b 43/02
U.S. Cl. 62—470
4 Claims

ABSTRACT OF THE DISCLOSURE

An oil separator for compressed refrigerant has an upright cylindrical shell which spacedly envelops a coaxial inner cylinder. Oil-bearing refrigerant is tangentially admitted to the annular gap between the shell and the cylinder, spirals downward in the gap and rises through layers of metal screening and porous foam plastic in the inner cylinder to an outlet at the top of the cylinder. Oil is centrifugally separated from the refrigerant in the annular gap. The metal screens break any foam of oil and refrigerant that may have formed, and the residual oil is filtered out by the plastic foam. Pure refrigerant is discharged from the top of the cylinder whereas the oil collects in the shell bottom and is drained.

BACKGROUND OF THE INVENTION

The present invention relates to an apparatus for separating and removing oil contained in refrigerant for a refrigerator. More particularly the invention relates to an apparatus to be disposed in a pipe line connecting a refrigerant compressor (freezer) and a refrigerant condenser (cooler) for separating and removing oil mixed with the refrigerant, such as ammonia, Freon, etc., while said refrigerant is being compressed.

When the compressed refrigerant containing oil is introduced into a cooler hardened oil sticks to the walls of the cooler tubing, whereby the cooling efficiency is lowered. It has long been a problem in this field to separate and remove all the oil contained in the refrigerant. It has been, however, extremely difficult to attain complete separation and removal of oil. The conventional oil separators, of which representative types are the spiral type and the longitudinal perforated plate system, could not get satisfactory results.

It is an object of the present invention to provide, in response to the demand, a high efficiency oil separator by which all the oil contained in the compressed refrigerant can be separated and removed.

It is another object of the invention to provide an oil separating apparatus which is simple, small and inexpensive.

SUMMARY OF THE INVENTION

The apparatus for separating and removing oil according to this invention functions in three steps. The apparatus is constructed in such a way that in the first step centrifugal separation of oil from the compressed refrigerant is performed by means of high speed rotation; in the second step, after said centrifugal separation, the compressed refrigerant is defoamed by passing through foam-breaking material; and finally, in the third step, residual oil is removed from the refrigerant by passage through a porous filter member such as synthetic resin sponge.

BRIEF DESCRIPTION OF THE DRAWING

The attached drawings illustrate apparatus for separating and removing oil according to this invention.

DETAILED DESCRIPTION OF THE PREFERRED EMBODIMENTS

Figure 1:
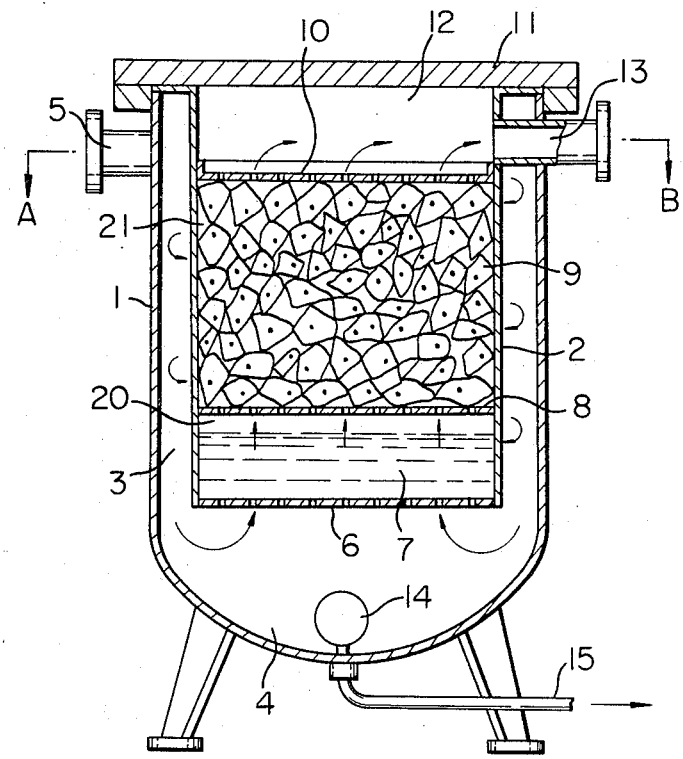
FIG. 1 is a front-elevational section of an embodiment of this invention.
Figure 2:
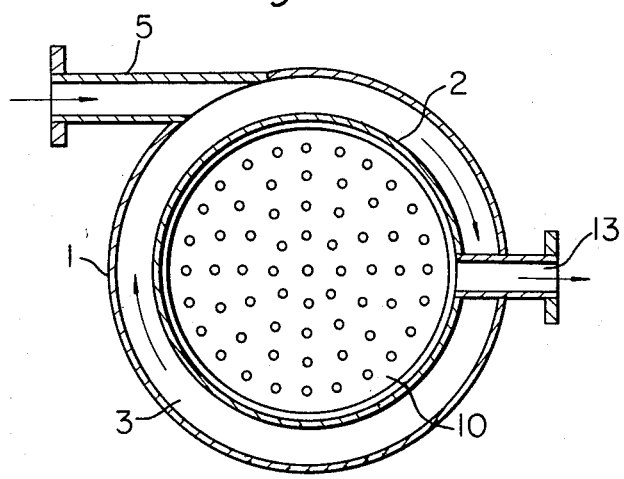
FIG. 2 is a sectional view taken along the line A–B of FIG. 1.

Referring to FIGS. 1 and 2, an upright cylindrical shell 1 having a dished bottom 4 spacedly envelops a coaxial, inner, tubular cylinder 2 so as to define therewith an annular gap 3. A cover 11 overlies the gap 3 and also upwardly closes the cylinder 2. An inlet pipe 5 for compressed refrigerant leads tangentially into the top portion of the gap 3. A refrigerant outlet pipe 13 extends outwardly from the cavity in the top of the cylinder 2 in a radial direction through the gap 3 and the shell 1. An automatic oil return valve 14 drains the shell bottom 4 to a return pipe 15 leading to the crankcase of the non-illustrated compressor.

Two perforated, horizontal plates 8, 10 axially divide the cavity of the cylinder 2 into an upper chamber 12 communicating with the outlet pipe 13, a large central chamber 21, and a smaller bottom chamber 20 which is downwardly bounded by a foraminous frame 6. The frame 6 retains layer of metal screens 7 which function as foam breakers in the bottom chamber 20. The central chamber 21 is occupied by soft, open-celled foam plastic or pulp. The upper chamber 12 is empty except for flowing refrigerant, and is sealed from the gap 3 by the cylinder 2.

The afore-described apparatus operates as follows:
Compressed refrigerant discharged by the non-illustrated compressor enters the gap 3 through the inlet pipe 5 and travels downwardly in the gap 3 at high speed in a spiraling path so that a first portion of the oil initially present in the refrigerant is separated from the latter by centrifugal forces. The refrigerant enters the cylinder 2 through the frame 6. Foam present is broken by the wire screens 7. The refrigerant carrying a very small amount of residual oil passes through the plate 8 and the porous material 9 which retains the remainder of the oil. The pure refrigerant is collected in the upper chamber 12 and then discharged to the non-illustrated cooler through the outlet pipe 13.

Figure 3:
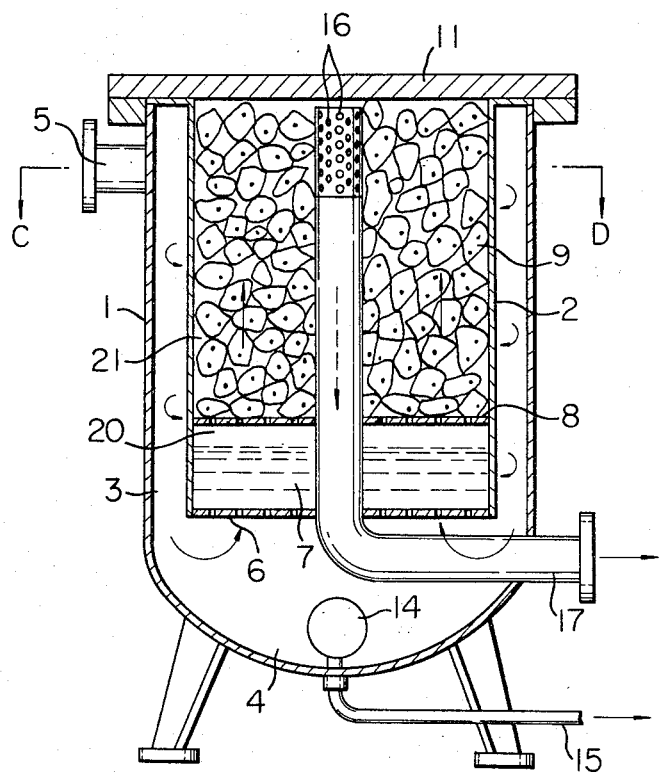
FIG. 3 is a front elevational section of another embodiment of this invention.
Figure 4:
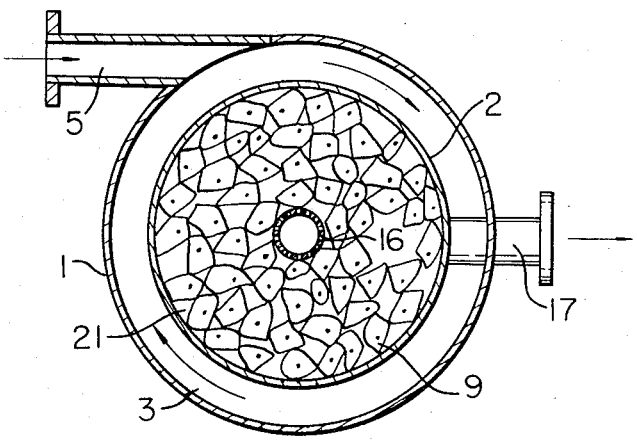
FIG. 4 is a sectional plan view taken along the line C–D of FIG. 3.

The modified apparatus shown in FIGS. 3 and 4 has a cylinder 2 which is divided by a perforated plate 8 into a small lower or bottom chamber 20 and a large upper chamber 21' upwardly bounded by the cover 11. The lower chamber 20 contains foam-breaking screens 7 while the upper chamber 21' is filled with the porous material 9.

Refrigerant is fed by an inlet pipe 5 into the annular gap 3 between the outer shell 1 and the cylinder 2, as described with reference to FIGS. 1 and 2, and enters the inner cylinder 2 from below. A portion of an outlet pipe 17 is coaxially arranged in the cylinder 2. The upper terminal portion of the pipe has radial bores 16 near the cover 11 to receive purified refrigerant. The pipe 17 extends into the shell bottom 4 and leaves the same in a radial direction. The basic mode of operation, as described above, is not affected by the structural differences between the two illustrated embodiments.

Both devices separate oil from the refrigerant in three steps, that is, by centrifugal forces, by breaking the foam of refrigerant and oil, and by passage through the open pores in the foam plastic or pulp. 100 percent separation is achieved as compared to 30–70 percent in conventional oil separators for compressed refrigerant. The oil separator of the invention occupies little space and can be built at little expense. Heat transfer in the refrigeration system is improved by the absence of a film of oil coating heat exchanging surfaces.

What is claimed is:

1. An apparatus for separating oil from compressed refrigerant comprising:
  (a) an outer shell of arcuate cross-section about an upright axis;
  (b) an inner tubular body arranged in said shell adjacent said axis and defining with said shell an annular gap about said axis;
  (c) cover means axially closing the upper end portions of said gap and of said tubular body, said outer shell having a bottom portion connecting the lower end portions of said gap and of said body;
  (d) inlet means for introducing oil-bearing refrigerant into said upper end portion of said gap in a direction tangential to a circle about said axis in said gap;
  (e) screening means in the lower end portion of said inner body for breaking a foam of refrigerant and oil;
  (f) a porous material occupying a central portion of said inner body intermediate said upper and lower end portions of the inner body;
  (g) a refrigerant discharge pipe communicating with said upper end portion of said inner body; and
  (h) drain means for draining oil from said bottom portion of said shell.

2. An apparatus as set forth in claim 1, wherein said shell and said body are substantially cylindrical about said axis, the apparatus further comprising a plurality of foraminous members extending transversely of said axis in said body in axially spaced relationship, one of said foraminous members downwardly bounding said lower end portion of said body, and another foraminous member separating said lower end portion of said body from said central portion thereof.

3. An apparatus as set forth in claim 2, wherein yet another one of said foraminous members separates said central portion from said upper end portion of said body.

4. An apparatus as set forth in claim 2, wherein said discharge pipe has an axially extending terminal portion in said upper end portion of said body, the terminal portion being formed with a plurality of radial bores therethrough.

References Cited

UNITED STATES PATENTS

| | | | |
|---|---|---|---|
| 2,608,269 | 8/1952 | Briggs | 62—470 X |
| 2,723,035 | 11/1955 | Anderson | 62—470 X |
| 2,749,723 | 6/1956 | Webber | 62—470 |
| 2,875,592 | 3/1959 | Olson | 62—470 X |

LLOYD L. KING, Primary Examiner